United States Patent [19]

Iwanaga et al.

[11] 4,271,939
[45] Jun. 9, 1981

[54] HYDRAULIC CONTROL SYSTEM FOR A HYDROKINETIC TORQUE CONVERTER

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 5,891

[22] Filed: Jan. 23, 1979

[30] Foreign Application Priority Data

Sep. 5, 1978 [JP] Japan .................. 53-108040

[51] Int. Cl.³ .......................................... F16D 37/00
[52] U.S. Cl. ................................................ 192/3.3
[58] Field of Search ................ 192/3.3, 3.29, 3.28, 192/3.31, 3.33

[56] References Cited

U.S. PATENT DOCUMENTS

| | | | |
|---|---|---|---|
| 2,736,412 | 2/1956 | Livezey | 192/3.3 |
| 2,824,632 | 2/1958 | Lucia et al. | 192/3.3 |
| 2,860,747 | 11/1958 | Kelley | 192/3.28 |
| 3,185,273 | 5/1965 | Smirl | 192/3.3 |
| 3,497,043 | 2/1970 | Leonard | 192/0.052 |
| 4,051,932 | 10/1977 | Arai et al. | 192/3.3 |
| 4,090,417 | 5/1978 | Burcz et al. | 192/3.3 |
| 4,108,022 | 8/1978 | Arai et al. | 192/3.33 |

FOREIGN PATENT DOCUMENTS

933973  10/1955  Fed. Rep. of Germany ........... 192/3.3

Primary Examiner—George H. Krizmanich
Attorney, Agent, or Firm—Schwartz, Jeffery, Schwaab, Mack, Blumenthal & Koch

[57] ABSTRACT

A hydraulic control system for a torque converter including a lockup clutch is disclosed in which a first or feed passageway communicates with a source of pressurized fluid and with a torque converter chamber, a second or discharge passageway communicates with the torque converter chamber and a third passageway communicates with a lock-up control or clutch chamber of the lockup clutch. A lock-up control valve communicates with the same source of pressurized fluid and with the third passageway. The first passageway is provided with a flow restrictor. With the provision of the flow restrictor, the disengagement of the lockup clutch will be assured upon pressurization of the third passageway.

9 Claims, 4 Drawing Figures

HYDRAULIC CONTROL SYSTEM FOR A HYDROKINETIC TORQUE CONVERTER

BACKGROUND OF THE INVENTION

The present invention relates to a hydraulic control system for a hydrokinetic torque converter including a lockup clutch.

As is well known in the art, in a torque converter there is a slippage between the pump impeller and the turbine runner during operations of the torque converter. For this reason, although it is easy to operate a vehicle which is provided with an automatic transmission including the torque converter as a part of a power transmitting train, the fuel consumption of the vehicle is increased. As a solution to this problem, various hydrokinetic torque converters have been proposed in which the pump impeller and the turbine runner are mechanically coupled together to prevent the slippage therebetween in a forward top speed gear range in which the torque multiplying effect of the torque converter is unnecessary and/or at a vehicle speed above a predetermined value at which speed the alteration of the engine torque has no influence on the riding quality of the vehicle.

In a hydraulic control system for a hydraulic torque converter of this kind, a pressure retaining or maintaining valve controls the flow of the hydraulic working fluid delivered from the torque converter to maintain the hydraulic pressure in the interior of the torque converter at a predetermined value, and a lock-up control chamber, a clutch chamber, communicates with a source of pressurized working fluid which supplies the hydraulic working fluid to the torque converter. Supply of the hydraulic working fluid into the lock-up control chamber releases a lock-up condition of the torque converter while exhaust of the hydraulic working fluid from the lock-up control chamber effects the lock-up condition of the torque converter to lock the pump impeller and the turbine runner together.

In this instance, the lock-up condition is attained by a pressure differential between the lock-up control chamber and a torque converter chamber communicating with the interior of the torque converter and is released by eliminating the pressure differential. The value of the hydraulic pressure in each of the torque converter chamber and the lock-up control chamber depends mainly on the length and size of each of the hydraulic working fluid supply passages for the torque converter and the lock-up control chamber. Thus, in some conventional hydraulic control systems for the torque converters, the flow resistance of a hydraulic working fluid supply passage for the lock-up control chamber has been larger than the flow resistance of a hydraulic working fluid supply passage for the torque converter so that the hydraulic pressure in the lock-up control chamber has been lower than the hydraulic pressure in the torque converter chamber when the hydraulic working fluid is fed into the lock-up control chamber. As a result, it has been impossible to surely release the lock-up condition of the torque converter. Accordingly, at this time there has been a risk that the turbine runner is directly rotated by the drive shaft for the pump impeller.

SUMMARY OF THE INVENTION

It is, therefore, an object of the invention to provide a hydraulic control system for the automatic torque converter which is so improved that when the hydraulic working fluid is fed into the lock-up control chamber, the hydraulic pressure in the lock-up control chamber is equal to or is higher than the hydraulic pressure in the torque converter chamber for ensuring release of the lock-up condition of the torque converter.

This object is accomplished by providing flow resistance means such as a flow restrictor in the hydraulic working fluid supply passage for the torque converter to make the flow resistance of the passage equal to or larger than the flow resistance of the hydraulic working fluid supply passage for the lock-up control chamber.

In particular, the present invention provides for a hydraulic control system for a torque converter including a lockup clutch in which a first or feed passageway communicates with a source of pressurized fluid and with a torque converter chamber, a second or discharge passageway communicates with the torque converter chamber and a third passageway communicates with a lock-up control or clutch chamber of the lockup clutch. A lock-up control valve communicates with the same source of pressurized fluid and with the third passageway. The first passageway is provided with the flow restrictor. With the provision of the flow restrictor, the disengagement of the lockup clutch will be assured upon pressurization of the third passageway.

BRIEF DESCRIPTION OF THE DRAWINGS

The present invention will become more apparent from the following detailed description taken in connection with the accompanying drawings in which.

DESCRIPTION OF THE PREFERRED EMBODIMENT

Figure 1:
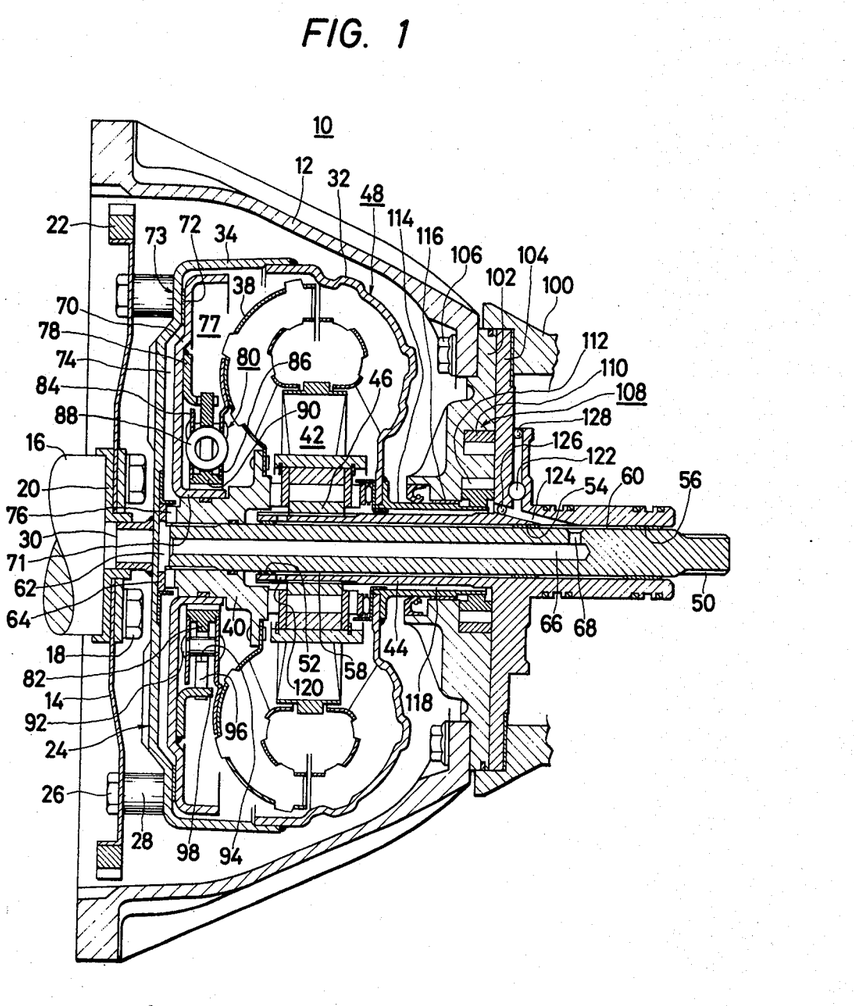
FIG. 1 is a schematic view of an example of a torque converter assembly including a hydrokinetic torque converter and a lock-up clutch.

Referring to FIG. 1, of the drawings, a torque converter assembly is shown which is controlled by a hydraulic control system according to the invention. The torque converter assembly, generally designated by the reference numeral 10, comprises a converter housing 12 and a drive plate 14 located in the housing 12 and fixedly concentrically secured to an end surface of a drive shaft 16 such as a crank shaft of an engine (not shown) by bolts 18 through a boss member 20. A ring gear 22 for starting the engine is fixedly secured to the periphery of the drive plate 14. A converter cover 24 is located between the housing 12 and the drive plate 14 and is fixedly concentrically secured to the drive plate 14 by bolts 26 through spacers 28. For centering the converter cover 24, a sleeve 30 is concentrically fixedly secured to and projects from the converter cover 24 and is fitted in the boss member 20.

A pump impeller 32 is fixed by welding to an end portion of an annular side wall 34 extending from an end wall 36 of the converter cover 24. The pump impeller 32 is driven by the engine through the drive shaft 16, the drive plate 14 and the converter cover 24 at all times during operations of the engine. A turbine runner 38 is securely fixed to a flange of a hub 40 by rivets and is driven by pressurized hydraulic fluid delivered from the pump impeller 32. A stator 42 is rotatably mounted on a stationary hollow shaft 44 by way of a one-way clutch 46 which prevents the stator 42 from being rotated in a direction opposite to the direction of rotation of the drive shaft 16. The pump impeller 32, the turbine runner 38 and the stator 42 constitute a hydrokinetic torque converter 48.

A transmission input shaft or a turbine shaft 50 passes through the stationary hollow shaft 44 and is spaced from an internal wall surface of the stationary hollow shaft 44. Three annular spacers or sleeves 52, 54 and 56 are disposed in an annular clearance between the inner wall surface of the stationary hollow shaft 44 and the turbine shaft 50 unmovably axially of the turbine shaft 50 and are spaced from each other axially of the turbine shaft 50. A first annular space 58 is defined between the spacers 52 and 54 and between the shafts 44 and 50, while a second annular space 60 is defined between the spacers 54 and 56 and between the shafts 44 and 50. The hub 40 of the turbine runner 38 is splined to the turbine shaft 50. An end surface of the turbine shaft 50 is spaced from the converter cover 24 so that a chamber 62 is defined therebetween. An annular spacer 64 is interposed between the converter cover 24 and an end surface of the hub 40 to surround the chamber 62. Fluid passages 66 and 68 are formed in the turbine shaft 50 and provide communication between the second annular space 60 and the chamber 62.

A lockup clutch piston 70 is arranged between the converter cover 24 and the turbine runner 38 movably toward and away from the converter cover 24 and is slidably fitted at an inner cylindrical portion 71 on an outer circumferential surface of the hub 40. An annular shim or face plate 72 is fixedly secured to a side surface of the clutch piston 70 and is contactable with the converter cover 24. The clutch piston 70, the face plate 72 and the converter cover 24 facing the face plate 72 constitute a lockup clutch 73. A lockup control chamber 74 is defined between the converter cover 24 and the lockup clutch piston 70 and between the spacer 64 and the face plate 72 and communicates with the chamber 62 by way of a groove 76 formed at the end surface of the hub 40. A torque converter chamber 77 is defined between the turbine runner 38 and the lockup clutch piston 70 and communicates with the interior of the torque converter 48. An annular connection member 78 of an angular shape in cross section is fixedly secured to a side surface of the lockup clutch piston 70 which faces the turbine runner 38. A torsional damper 80 is disposed in a relatively broad space at a radially inward portion of the torque converter chamber 77.

The torsional damper 80 includes a drive plate 82, a pair of driven plates 84 and 86 arranged respectively on both sides of the drive plate 82, and a torsion spring 88 interposed between the driven plates 84 and 86. The torsional damper 80 has a damper mechanism similar to that of a torsional damper used for a clutch disk and so on. The drive plate 82 has at its radially inward portion a hub 90 arranged around the cylindrical portion 71 of the lockup clutch piston 70 and spaced from the cylindrical portion 71. The driven plates 84 and 86 are fitted respectively on both side portions of the hub 90 and are connected to each other by rivets 92. The drive plate 82 is formed therethrough with round holes 94 and notches 96. The shaft portions of the rivets 92 pass respectively through the round holes 94 to define a clearance between the shaft portion of each rivet 92 and an inner wall surface of each round hole 94. The notches 96 are arranged at equal intervals radially outwardly of the round holes 94. The notches 96 aligned with the round holes 94 communicate with the round holes 94. The connection member 78 has at its radially inward portion projections 98 axially extending toward the turbine runner 38. The projections 98 pass through or are engaged in the notches 96 respectively to drivingly connect the connection member 78 and the torsional damper 80 to each other. The driven plate 86 adjacent the turbine runner 38 is concentrically fixedly secured to the turbine runner 38 by welding.

The converter housing 12 is fixedly secured at an open end adjacent the pump impeller 32 to a transmission case 100 together with a pump housing 102 and a pump cover 104 by bolts 106. The pump cover 104 is formed of a flange formed integral with the stationary hollow shaft 44. The pump housing 102 contains therein an oil pump 108 including an outer gear 110 and an inner gear 112 meshed with the outer gear 110. A pump drive shaft 114 is received at its mid portion in a bush or bearing 116 mounted in the pump housing 102. The pump drive shaft 114 takes the form of a sleeve arranged around the stationary hollow shaft 44 and is fixedly secured at one end to the pump impeller 32 and is splined at the other end to the inner gear 112. An annular passage 118 is defined between the stationary hollow shaft 44 and the pump drive shaft 114 and communicates at one end with the interior of the pump impeller 32 and at the other end with regulator means for torque converter working pressure, which will be set forth hereinafter, by way of a passage (not shown) provided in the oil pump 108.

An aperture 120 is formed in the stationary hollow shaft 44 and provides communication between the interior of the turbine runner 38 and the first annular space 58. The first annular space 58 communicates with a hydraulic fluid reservoir a passage 1058, a pressure retaining valve, a relief valve and various lubricated portion, as will be set forth hereinafter. The second annular space 60 communicates with a lockup clutch control valve 122, which will be set out hereinafter, by way of a passage 124 formed in the pump cover 104. The passage 124 is sealed from the exterior thereof by steel balls 126 and 128 forced into the passage 124. The lockup clutch control valve 122 functions to switch over the connection of the passage 124 alternatively to the regulator means and the hydraulic fluid reservoir.

Figure 2:
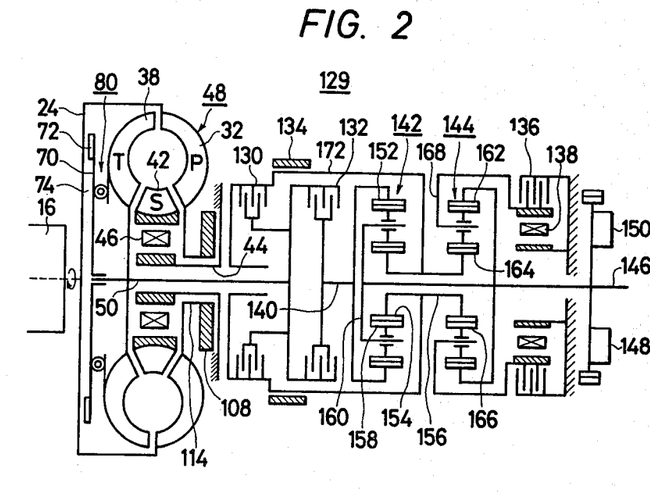
FIG. 2 is a schematic view of an example of an automatic transmission including the torque converter assembly shown in FIG. 1.

Referring to FIG. 2 of the drawings, there is diagrammatically shown an example of an automatic power transmission employing the lockup torque converter assembly 10 described hereinbefore. The transmission, generally designated by the reference numeral 129, has three forward speed ranges and one reverse speed range and includes a front clutch 130, a rear clutch 132, a second brake 134, a low and reverse brake 136, a one-way clutch 138, an intermediate shaft 140, a first planetary gear set 142, a second planetary gear set 144, an output shaft 146, a first governor valve 148 and a second governor valve 150.

The first planetary gear set 142 includes an internally toothed ring gear 152 fixed to the intermediate shaft 140, an externally toothed sun gear 154 fixed to a hollow shaft 156, at least two planet pinions 158 meshed with both the ring and sun gears 152 and 154, and a front pinion carrier 160 fixed to the output shaft 146 and carrying the planet pinions 158. Each of the planet pinions 158 is rotatable around its axis and simultaneously revolvable around the sun gear 154. The second planetary gear set 144 includes an internally toothed ring gear 162 fixed to the output shaft 146, an externally toothed sun gear 164 fixed to the hollow shaft 156, at least two planet pinions 166 in mesh with both the ring and sun gears 162 and 164, and a rear planet carrier 168 carrying the planet pinions 166. Each of the planet pinion 166 is rotatable around its axis and concurrently rovolvable around the sun gear 164. The front clutch 130 functions to connect the turbine shaft 50 to the hollow shaft 156 through a brake drum 172 fixed thereto when the front clutch 130 is engaged or tightened, while the rear clutch 132 functions to connect the input shaft 50 to the ring gear 152 of the first planetary gear set 142 through the intermediate shaft 140 when the rear clutch 132 is engaged or tightened. The second brake 134 takes the form of a band which is arranged around the brake drum 172 and functions to lock the hollow shaft 156 and both the sun gears 154 and 164 when the band is tightly wound on the brake drum 172. The low and reverse brake 136 functions to lock the rear planet carrier 168 of the second planetary gear set 144 when the brake 136 is applied. The one-way clutch 138 is constructed and arranged to allow the rotation of the rear planet carrier 168 in the direction similar to that of rotation of the drive shaft 16 but not allow the rotation in the reverse direction. The first and second governor valves 148 and 150 each are fixed to the output shaft 146 and deliver governor pressure representative of the speed of a vehicle equipped with the engine and form part of a hydraulic control system for the transmission 129 as described hereinafter.

The transmission 129 thus described is operated in the following manner.

When a manual selector lever (not shown) for the transmission 129 is set to an automatically shifted forward driving range position "D", the rear clutch 132 only is engaged. The power of the engine is transmitted to the ring gear 152 of the first planetary gear set 142 by way of the rear clutch 132 after is transmitted to the input shaft 50 by way of the turbine runner 38. The planet gears 158 are rotated by the ring gear 152 in the same direction as that of rotation thereof. Accordingly, the sun gear 154 is rotated by the planet gears 158 in the reverse direction and since the sun gear 164 rotated integral with the sun gear 154 is similarly rotated in the reverse direction, the planet gear 166 of the second planetary gear set 144 is rotated by the sun gear 164 in the direction similar to that of rotation of the input shaft 50. The one-way clutch 138 acts as a reaction brake which prevents the rear planet carrier 168 from being rotated by the sun gear 164 in the reverse direction. Accordingly, the ring gear 162 is rotated by the planet gears 166 in the direction similar thereto. Therefore, the output shaft 146 rotated integral with the ring gear 162 is also rotated in the direction similar thereto. The forward drive first speed is thus provided. At this condition, when the vehicle speed increases, the second brake 134 is tightened. The power of the engine from the input shaft 50 is transmitted to the ring gear 152 by way of the rear clutch 132 similarly to in the case of the first speed. The second brake 134 acts as a reaction brake which locks the brake drum 172 to prevent the rotation of the sun rear 154. As a result, the planet pinions 158 revolves around the sun gear 154 in rest with the planet pinions 158 while rotates around its axis. Accordingly, the front planet carrier 160 and the output shaft 146 integral therewith are rotated at a speed higher than that in the case of the first speed but lower than that of the input shaft 50 in the direction similar thereto. The forward drive second speed is thus provided. When the vehicle speed further increases, the second brake 134 is loosened and the front clutch 130 is engaged. The engine power from the input shaft 50 is transmitted to the ring gear 152 by way of the rear clutch 132 on the one hand and to the sun gear 154 by way of the front clutch 130 on the other hand. The ring gear 152 and the sun gear 154 are locked to each other and are integrally rotated together with the front planet carrier 160 and the output shaft 146 at the same speed as that of the input shaft 50 in the direction similar thereto. Thus, the forward drive third speed is provided. In this instance, the front and rear clutchs 130 and 132 act as input clutches and since the engine torque is not increased by the planetary gear set, there is no reaction brake.

When the manual selector lever is set to a rearward driving range position "R", the front clutch 130 and the low and reverse brake 136 are tightened. The engine power from the input shaft 50 is transmitted to the sun gears 154 and 164 by way of the front clutch 130 and the brake drum 172. Since the rear planet carrier 168 is locked by the low and reverse brake 136, when the sun gear 164 is rotated in the direction similar to the input shaft 50, the ring gear 162 and the output shaft 146 are integrally rotated at a speed lower than that of the input shaft 50 in the direction reverse thereto. Thus, the rearward drive is obtained.

Figure 3A:
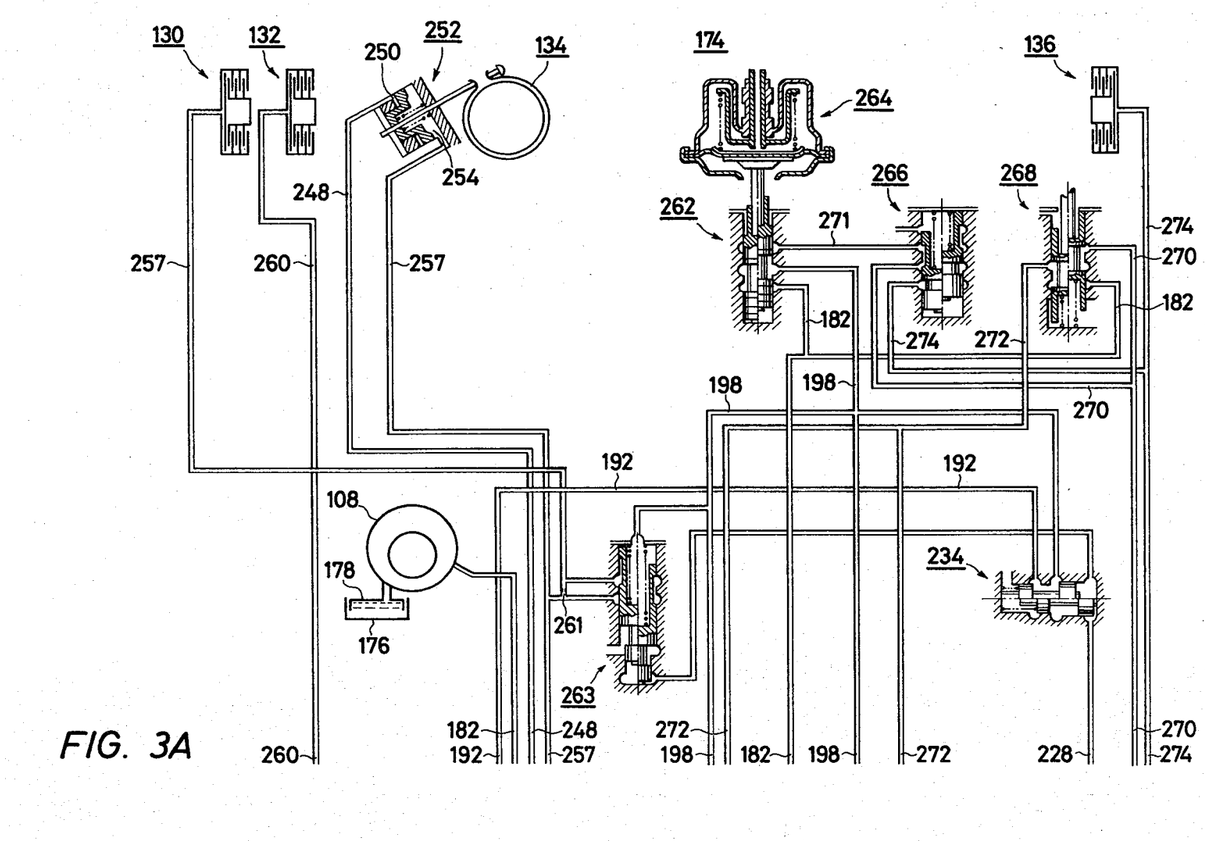
FIG. 3 is a schematic view of an embodiment of a hydraulic control system for the automatic transmission shown in FIG. 2 according to the invention.
Figure 3B:
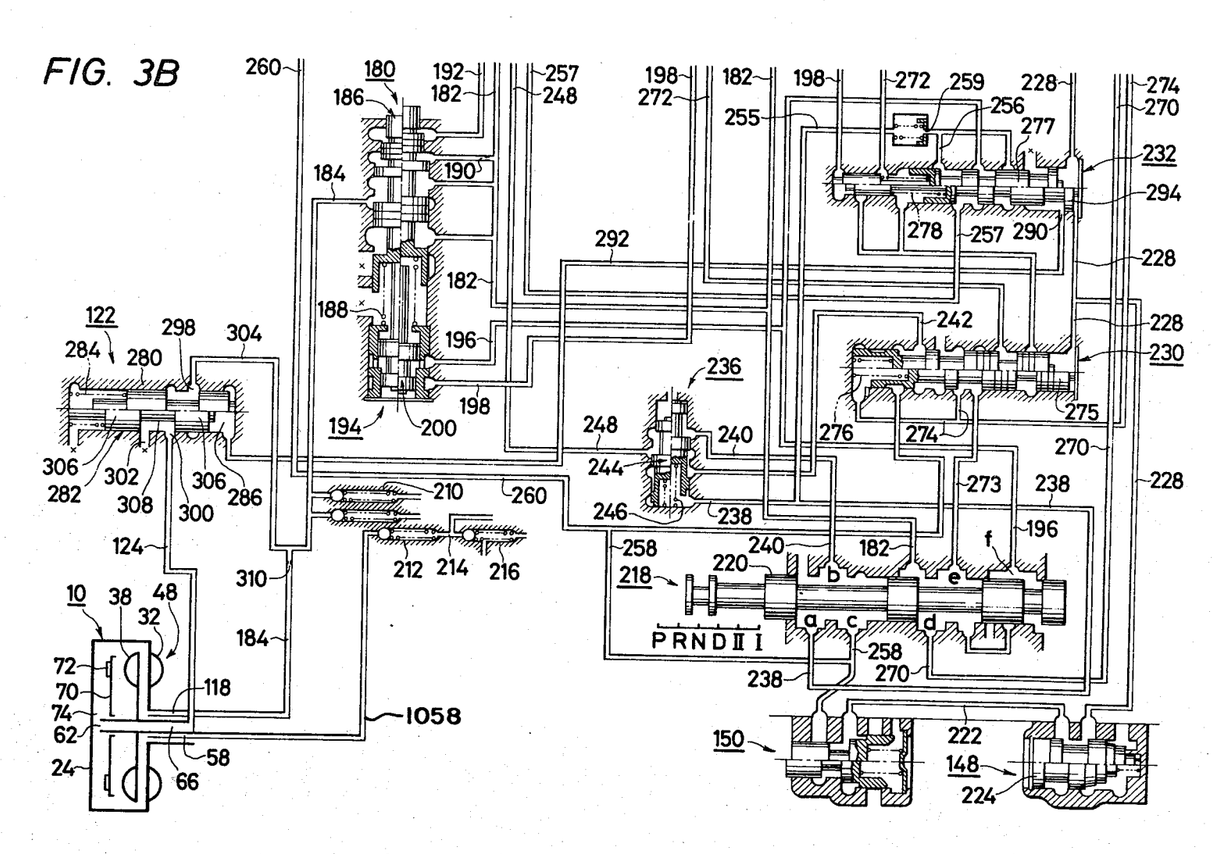

Referring to FIG. 3 of the drawings, there is shown an embodiment of a hydraulic control system according to the invention which is applied to the automatic transmission 129. The hydraulic control system, generally designated by the reference numeral 174, comprises the oil pump 108 which is driven by the engine through the pump impeller 32 and the pump drive shaft 114 at all times during operations of the engine. The oil pump 108 draws hydraulic fluid from a hydraulic fluid reservoir 176 by way of a strainer 178 eliminating foreign matters from the hydraulic fluid and delivers pressurized hydraulic fluid into a passage 182 during operations of the engine. The oil pump 108 communicates with a pressure regulator valve 180 by way of the passage 182. The pressure regulator valve 180 regulates the hydraulic fluid pressure in the passage 182 to a working pressure or a line pressure having a predetermined value. The passage 182 communicates with the annular passage 118 by way of the pressure regulator valve 180 and a passage 184 to feed the working pressure to the torque converter 48. The pressure regulator valve 180 has a spool 186 and a spring 188 urging the spool 186 upward in the drawing. The line pressure in the passage 182 acts on the spool 186 by way of an orifice 190 to urge the spool 186 downward in the drawing. The pressure regulator valve 180 communicates with a passage 192 to receive a hydraulic pressure which acts on the spool 186 to urge the same downward. A pressure booster valve 194 communicates with a passage 196 to receive the line pressure and with a passage 198 to receive a throttle pressure and has a spool 200 which is urged by the line pressure in the passage 196 and by the throttle pressure in the passage 198 to urge the spool 186 upward. The passage 184 communicates with a front lubricated portion of a power transmitting mechanism by way of a valve 210 which is opened to supply lubricating hydraulic fluid thereto. The first annular space 58 communicates with a pressure retaining valve 212 which maintains the pressure in the space 58 below a predetermined value. When the pressure in the first annular space 58 is above the predetermined value, the pressure retaining valve 212 is opened to permit communication between the space 58 and a passage 214 to feed lubricating hydraulic fluid to a rear lubricated portion of the power transmitting mechanism. The passage 214 communicates with a relief valve 216 which is opened to reduce the pressure of the lubricating hydraulic fluid when the lubricating hydraulic fluid is excessively high.

A manual selector valve 218 has a port communicating with the passage 182, and a spool 220 connected to the manual selector lever through a linkage (not shown). The manual selector valve 218 has P, R, N, D, II and I positions and ports a, b, c, d, e and f and is moved into the P, R, N, D, II and I range positions to control communication between the passage 180 and the ports a, b, c, d, e and f when the manual selector lever is manipulated. The port c communicates with the second governor valve 150 which modulates the line pressure into the governor pressure which is fed to the first governor valve 148 by way of a passage 222 when the vehicle travels. The first governor valve 148 serves as an on-off valve in which a spool 224 is moved to provide communication between the passage 222 and a passage 228 which communicates with a 1-2 shift valve 230, a 1-3 shift valve 232 and a pressure modifier valve 234 when the vehicle speed reaches a predetermined value. The governor pressure in the passage 228 acts on an end of a spool of each of the valves 230, 232 and 234 to urge leftward in the drawing the spool which is urged by a spring rightward in the drawing. The ports a and b communicate with a second lock valve 236 by way of passages 238 and 240 respectively. The line pressure from the port a acts on a spool 244 of the second lock valve 236 to urge the spool 244 upward in the drawing. A spring 246 urges the spool 244 upward. The line pressure from the port b acts on the spool 244 to urge the same downward in the drawing. The passage 248 communicates with an applying chamber 250 of a servo 252 which controls the second brake 134. The passage 248 is communicable alternatively with the passage 240 and a passage 242 by way of the second lock valve 236. The passage 238 is communicable with a release chamber 254 of the servo 252 and with the front clutch 130 by way of passage 255, an orifice check valve 259, a passage 256, the 2-3 shift valve 232 and a passage 257. The port c is communicable with the passage 242 by way of a passage 258 and the 1-2 shift valve 230 and communicates with the rear clutch 132 by way of the passage 258 and a passage 260. A throttle valve 262 communicates with the passages 182 and 198 and is operated by a diaphragm unit 264 responsive to a suction vacuum of the engine. The throttle valve 262 modulates the line pressure from the passage 182 in accordance with the engine suction vacuum and delivers in the passage 198 a throttle pressure which varies in accordance with the load of the engine. The port d communicates with a throttle backup valve 266 and with a forced downshift valve 268 by way of a passage 270. A passage 271 provides communication between the throttle valve 262 and the throttle backup valve 266. The passage 271 communicates with the passage 198 by way of the throttle valve 262 and is communicable with the passage 270 by way of the throttle backup valve 266. The passage 182 communicates with the downshift valve 268. A passage 272 communicates with the 1-2 shift valve 230 and the 2-3 shift valve 232 and is alternatively communicable with the passage 182 and 270 by way of the downshift valve 268. The port e is communicable with the low and reverse brake 136 and the throttle backup valve 266 by way of a passage 273, the 1-2 shift valve 230 and a passage 274. The port f communicates with the pressure regulator valve 180 by way of the passage 196 and is communicable with the passage 257 by way of the passage 196 and the 1-3 shift valve 232. The manual selector valve 218 provides communication between the passage 182 and the ports a, b and c when the manual selector lever is set to the D position. At this condition, the line pressure from the port c is fed to the rear clutch 132 to engage the same, and the spool 244 of the second lock valve 236 is pushed up to an upward position as shown in the right half of the illustration of the valve 236 and provides communication the passages 242 and 248. Thus, the transmission 129 provides the forward drive first speed gear when the 1-2 shift valve 230 is in a right-hand position in the drawing to obstruct communication between the passages 242 and 258 and the 2-3 shift valve 232 is in a right-hand position in the drawing to obstruct communication between the passages 256 and 257. At this condition, when the vehicle speed increases to a predetermined or desired value, the spool 275 of the 1-2 shift valve 230 is moved by the governor pressure in the passage 228 in opposition to the action of the spring 276 from the right-hand position into a left-hand position in the drawing to provide communication between the passages 242 and 258. The line pressure in the passage 258 is fed into the applying chamber 250 of the servo 252 by way of the passage 242, the second lock valve 236 and the passage 248 to apply the second brake 134. The transmission 129 is thus automatically shifted from the forward drive first speed gear to the forward drive second speed gear. When the vehicle speed further increases to a predetermined higher value, the spool 277 of the 2-3 shift valve 232 is moved by the governor pressure in the passage 228 in opposition to the action of the spring 278 from the right-hand position to a left-hand position in the drawing to provide communication between the passages 256 and 257. The line pressure from the passage 257 is fed on the one hand to the release chamber 254 of the servo 252 to release the second brake 134 and on the other hand to the front clutch 130 to engage the same. The transmission 129 is automatically shifted from the forward drive second speed gear to the forward drive third speed gear. When a downshift effort is performed, the downshift valve 268 is moved by, for example, a solenoid (not shown) to provide communication between the passage 182 and 272 to shift the 1-2 shift valve 230 and the 2-3 shift valve 232 to the right-hand positions.

The manual selector valve 218 provides communication between the passage 182 and the ports b, c and d when the manual selector lever is set to the II (forward drive second speed lock) position. In this instance, since the port a is separated from the passage 182 so that the line pressure is not fed from the passage 238 to the second lock valve 236, the spool 244 of the second lock valve 236 is pushed down by the line pressure in the passage 240 in opposition to the action of the spring 246 to a downward position as shown in the left half of the illustration of the valve 236 and provides communication between the passages 240 and 248. The line pressure is fed from the passage 248 to the apply chamber 250 of the servo 252 to apply the second brake 134 and is also fed from the port c to the rear clutch 132 to engage the same. Since the line pressure is not fed from the port a to the passage 255 so that the release of the second brake 134 and the engagement of the front clutch 130 do not occur, the transmission 129 is not shifted to the forward drive third speed gear. Thus, the transmission 129 is locked in the forward drive second speed gear. The throttle backup valve 266 delivers a hydraulic pressure into the passage 271 in response to the line pressure from the passage 270. The throttle valve 262 delivers into the passage 198 a hydraulic pressure higher than the throttle pressure which is independent of the engine load in response to the hydraulic pressure from the passage 271. The pressure regulator valve 180 increases the line pressure in response to the hydraulic pressure from the passage 198 so that the engine brake effect is promoted.

The manual selector valve 218 is moved to provide communication between the passage 182 and the ports c, d and e when the manual selector lever is set to the I (forward drive first speed gear lock) position. The rear clutch 132 is engaged by the line pressure fed from the port c by way of passage 268. The 1-2 shift valve 230 is moved into the right-hand position by the line pressure fed from the port d by way of the downshift valve 268 and the passage 272. The low and reverse brake 136 is applied by the line pressure fed from the port e by way of the 1-2 shift valve 230 and the passage 274. Thus, the transmission 129 provides the forward drive first speed gear. The line pressure from the passage 274 also acts on the 1-2 shift valve 230 to lock the same in the right-hand position. Thus, the forward drive first speed gear is locked. The throttle backup valve 266 stop to deliver the hydraulic pressure into the passage 271 so that the throttle valve 262 delivers the throttle pressure into the passage 198.

The manual selector valve 218 provides communication between the passage 182 and the ports d, e and f when the selector lever is set to the R (reverse drive gear) position. The low and reverse brake 136 is applied by the line pressure from the port e, while the line pressure is fed from the port f to the release chamber 254 of the servo 252 and to the front clutch 130 by way of the 2-3 shift valve 232 and the passage 257 to release the second brake 134 and to engage the front clutch 130. Thus, the transmission 129 provides the reverse drive gear.

The lockup control valve 122 is incorporated into the hydraulic control system 174 to constitute a hydraulic control system for controlling the torque converter 48 and the lockup clutch 73. The lockup control valve 122 is so constructed and arranged that the lockup clutch 73 is engaged to effect a lockup condition of the torque converter 48 when the transmission 129 provides the forward drive top gear and the vehicle speed is above a predetermined value. The lockup control valve 122 comprises a valve body 280, a spool 282 slidably fitted in the valve body 280, and a spring 284 urging the spool 282 rightward in the drawing. A space 286 is provided between an end surface of the spool 282 and an internal wall surface of the valve body 280 to receive the governor pressure. A port 290 is formed in a valve body of the 2-3 shift valve 232 and is communicable with the passage 228 to take out the governor pressure therefrom. A passage 292 provides communication between the space 286 and the port 290. The spool 277 of the 2-3 shift valve 232 has a land 294 which obstructs communication between the port 290 and the passage 228 when the spool 277 is in the right-hand position as shown in the lower half of the illustration of the 2-3 shift valve 232 and which permits communication between the port 290 and the passage 228 when the spool 277 is in the left-hand position as shown in the upper half of the illustration of the valve 232. The governor pressure in the space 286 urges the spool 282 leftward in the drawing.

The valve body 280 of the lockup control valve 122 is formed with inlet, outlet and drain ports 298, 300 and 302. The inlet port 298 communicates with the passage 184 by way of a passage 304, while the outlet port 300 communicates with the passage 124 and is alternatively communicable with the inlet and drain ports 208 and 302. The spool 282 has a land portion 306 and a groove 308. The land 306 obstructs communication between the outlet and drain ports 300 and 302 and the groove 308 provides communication between the inlet and outlet ports 298 and 300 when the spool 282 is in a position as shown in the upper half of the illustration of the valve 122. The land portion 306 obstructs communication between the inlet and outlet ports 298 and 300 and the groove 308 provides communication between the outlet and drain ports 300 and 302 when the spool 282 is in a position as shown in the lower half of the illustration of the valve 122.

Flow resistance means 310 is provided in the passage 184 at a position downstream of the junction of the passages 184 and 304 for preventing the hydraulic pressure in the torque converter chamber 77 from being higher the hydraulic pressure in the lock-up control chamber 74 when the hydraulic working fluid is fed thereinto. The flow resistance means 310 is, in the embodiment, a restriction defining an orifice or a restricted passage having a cross sectional area smaller than that of the passage 184.

Figure 4:
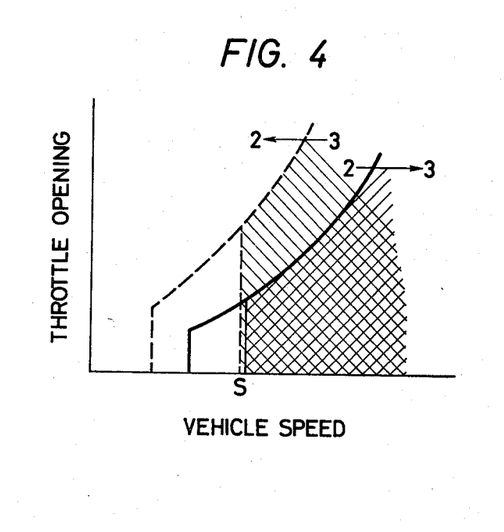
FIG. 4 is a graphic representation of a relationship between the speed of a vehicle equipped with the transmission and the degree of opening of a throttle valve for an engine of the vehicle at speed shifts and the vehicle speeds at which a lock-up condition of the torque converter is effected.

The hydraulic control system for the lockup torque converter 48 thus described is operated as follows:

When the vehicle travels at a speed gear other than the forward drive top gear, the 2-3 shift valve 232 obstructs communication between the passage 228 and 292 so that the governor pressure is not fed to the space 286 of the lockup control valve 122. Also, when the vehicle travels at the forward drive top gear but at a speed lower than a predetermined value S as shown in FIG. 4 of the drawings, the force of the governor pressure in the space 286 acting on the spool 282 is smaller than the force of the spring 284. In these two cause, the spool 282 of the lockup control valve 122 is moved by the action of the spring 284 into the right-hand position in the drawing. At this state, the port 300 communicates with the port 298 so that the working pressure is fed to the torque converter 48 by way of the passage 184 and is also fed to the lockup control chamber 74 by way of the passage 304, the ports 298 and 300 and the passages 124, 60, 68, 66 and 62. Accordingly, the working pressure in the lockup control chamber 74 is also maintained at a value below a predetermined value by the pressure retaining valve 212. Since the working pressure fed to the torque converter 48 is lowered by the restriction 310 in the passage 184, the working pressures acting on both side surfaces of the lockup clutch piston 70 are equal to each other or the working pressure in the lockup control chamber 74 becomes higher than that in the torque converter chamber 77 so that the piston 70 is not pressed against the converter cover 24. Accordingly, the lockup clutch 73 is disengaged to release the lock-up condition of the torque converter 48.

At this state, the working hydraulic fluid flowing in the torque converter 48 transmits torque of the pump impeller 32 to the turbine runner 38 under reaction torque created by the stator 42 while varying the pump impeller torque. The rotation of the turbine runner 38 is transmitted to the input shaft 50 by way of the hub 40 and then to the gear train of the transmission 129.

When the transmission 129 provides the forward drive top gear at the D range position of the selector lever, in this embodiment, the third speed gear, the spool 277 of the 2-3 shift valve 232 is in the position as shown in the upper half of the illustration of the valve 232. Accordingly, the port 290 communicates with the passage 228 so that the governor pressure is admitted into the space 286 by way of the passage 292. At this state, when the vehicle speed is increased to a value above the predetermined value S, the governor pressure in the space 286 is increased in response to the increase in the vehicle speed to move the spool 282 into the left-hand position shown in the lower half of the illustration of the valve 122 in opposition to the force of the spring 284. Accordingly, the port 300 communicates with the drain port 302 so that hydraulic fluid in the lockup control chamber 74 flows to the drain port 302 by way of the passages 64, 62, 66, 68, 60 and 124 and the port 300. At the same time, the lockup clutch piston 70 is moved toward the converter cover 24 by the working pressure in the torque converter chamber 77 having become higher than the pressure in the lockup control chamber 74 to press the face plate 72 against an internal wall surface of the converter cover 24 to engage the lockup clutch 73 to effect the lock-up condition of the torque converter 48. Thus, the pump impeller 32 and the turbine runner 38 are locked together, that is, the drive shaft 16, the converter cover 24 and the pump impeller 32 are directly drivingly connected to the lockup clutch piston 70 and rotate integral with the piston 70. The rotation of the drive shaft 16 is mechanicaly transmitted to the input shaft 50 by way of the converter cover 24, the piston 70 and the torsional damper 80, that is, in particular, the connection member 78, the projections 98, the drive plate 82, the torsion spring 88 and the driven plates 84 and 86. An impact at the initial stage of transmission of the engine torque to the torsional damper 80 is absorbed by the torsion spring 88. Accordingly, the torsional damper 80 serves to absorb the impact and at the same time to transmit the engine torque. Thus, the turbine runner 38 is directly drivingly connected to the drive shaft 16 by way of the torsional damper 80, the lockup clutch piston 70 and the converter cover 24 so that the torque converter 48 is in the locked-up condition in which the turbine runner 38 is directly driven by the drive shaft 16 but not by hydraulic fluid.

The range in which the torque converter 48 is in the lock-up condition is a range shown by hatching in FIG. 4 and in which the vehicle speed is above the predetermined value S with the transmission 129 in the forward third speed range. In the range shown by the hatching, a slippage is eliminated which is produced between the pump impeller 32 and the turbine runner 38 of the torque converter 48 and the fuel consumption of the vehicle is reduced with the vehicle travelling smoothly without producing vibration due to alteration of the engine torque.

The lock-up condition of a hydrokinetic torque converter can be effected at suitable operating conditions of an automatic transmission and/or a vehicle other than the forward top or third speed range of the transmission and vehicle speeds above the predetermined value S.

It will be thus appreciated that the invention provides a hydraulic control system for controlling a lock-up of a hydrokinetic torque converter in which system flow resistance means such as an orifice is provided in a hydraulic working fluid supply passage for a torque converter chamber and at a location downstream of the junction of the passage and a hydraulic working fluid supply passage for a clock-up control chamber to prevent the hydraulic pressure in the torque converter chamber communicating with the interior of the torque converter from becoming higher than the hydraulic pressure in the lock-up control chamber when the hydraulic working fluid is fed thereinto to prevent a lock-up clutch piston from being rotated by a converter cover at this time.

What is claimed is:

1. A torque converter comprising
   a converter cover;
   a pump impeller secured to said converter cover and forming therewith a torque converter chamber;
   a turbine runner within said torque converter chamber;
   a clutch piston within said chamber cooperating with said converter cover to form a lock-up chamber;
   a source of pressurized fluid;
   a first passageway communicating with said source of pressurized fluid and with said torque converter chamber for feeding the pressurized fluid to the latter;
   a second passageway communicating with said torque converter chamber for discharging the pressurized fluid from the latter;
   a third passageway communicating with said lock-up chamber;
   a lock-up control valve communicating with said source of pressurized fluid and with said third passageway to pressurize said third passageway with the pressure of the pressurized fluid;
   said clutch piston having a lock-up position and a release position, and adapted to assume said lock-up position when the pressure in said lock-up chamber is relieved and the pressure in said torque converter housing biases said clutch piston toward said lock up position; and
   means disposed in said first passageway for ensuring the pressure prevailing in said torque converter housing is lower than the pressure which prevails in said lock-up chamber when said lock-up chamber is pressurized to bias said clutch piston toward said release position, so that said clutch piston unfailingly separates from said converter cover and moves to said release position upon pressurization of said lock-up chamber, said lower pressure ensuring means comprising a flow restrictor.

2. A torque converter as claimed in claim 1, in which
   said clutch piston is drivingly connected to said turbine runner;
   and in which
   said clutch engages with said converter cover to form therewith said lock-up chamber.

3. A lock-up torque converter comprising:
- an impeller portion and a turbine portion cooperating to at least partially define a torque converter fluid path;
- a lock-up clutch coupled with at least one of said portions, said clutch having an element movable between engaged and disengaged positions;
- a source of pressurized fluid;
- means, communicating with said source of fluid and with said torque converter fluid path, for continuously circulating fluid through said torque converter fluid path to and from said fluid source irrespective of engagement or disengagement of the lock-up clutch;
- a flow restriction in said means communicating said source of fluid with said torque converter path, between said source of fluid and said torque converter path;
- said movable element of said lock-up clutch having first and second pressure acting areas, said fluid which continuously circulates through said torque converter communicating with said first pressure acting area to urge said movable element of said lock-up clutch toward said engaged position;
- means, communicating with said source of fluid and with said second pressure acting area, for selectively supplying, independently of said continuous circulating means, fluid to said second pressure acting area of said torque converter to urge said movable element of said lock-up clutch toward said disengaged position.

4. A lock-up torque converter as defined in claim 3, wherein said means for continuously circulating fluid includes a first passageway communicating with said source of fluid and with said torque converter fluid path for feeding fluid to said torque converter fluid path and a second passageway communicating with said torque converter fluid path for discharging fluid therefrom.

5. A lock-up torque converter as defined in claim 4, wherein said means for selectively supplying fluid to said second pressure acting area includes a third passageway communicating with said second pressure acting area and a lock-up control valve communicating with said source of fluid and with said third passageway to selectively pressurize said third passageway when disengagement of the lock-up clutch is required.

6. A lock-up torque converter as defined in claim 5, wherein said flow restrictor is in said first passageway, whereby said fluid which continuously circulates through said torque converter is at a lesser pressure than said fluid selectively supplied to said second pressure acting area.

7. A lock-up torque converter as defined in claim 3, wherein said source of pressurized fluid includes means for generating a first fluid pressure and a second fluid pressure greater than said first fluid pressure, said first fluid pressure being the pressure of said fluid which continuously circulates through said torque converter fluid path, said second pressure being said fluid pressure which acts on said second pressure acting area.

8. A lock-up torque converter as defined in claim 7, wherein said first pressure generating means includes a pump in combination with a flow restrictor and wherein said second pressure generating means includes said pump alone.

9. In an automotive transmission having a lock-up torque converter and a hydraulic control system including a shift valve having a first speed position and a second higher speed position, the combination of:
- a torque converter cover;
- a pump impeller secured to said converter cover to define a torque converter chamber;
- a turbine runner disposed within said torque converter chamber;
- a clutch piston within said torque converter chamber and cooperating with said converter cover to define a lock-up chamber, said lock-up chamber occupying a part of said converter chamber, said lock-up chamber being communicable with the remainder of said converter chamber when said clutch piston is disengaged from said converter cover and separated from the remainder of said converter chamber when said clutch piston frictionally engages with said converter cover;
- a source of pressurized fluid;
- means defining a first passageway which fluidly communicates with said source of pressurized fluid and the remainder of said torque converter chamber;
- means defining a second passageway communicating with the remainder of said torque converter chamber for controllably draining fluid therefrom;
- a lock-up valve fluidly communicating with said source of pressurized fluid and said lock-up chamber for normally providing fluid communication between said source and said lock-up chamber, said lock-up valve being fluidly communicated with the shift valve and adapted to interrupt said normal communication and for relieving the pressure in said lock-up chamber in exclusive response to the shift valve assuming the second speed position thereof; and
- a flow restrictor disposed in said first passageway between said source of pressurized fluid and the remainder of said torque converter chamber for ensuring the pressure prevailing in said torque converter housing is lower than the pressure fed to said lock-up chamber when said shift valve is in the first speed position thereof.

* * * * *